(12) United States Patent
Burns

(10) Patent No.: US 6,761,072 B1
(45) Date of Patent: Jul. 13, 2004

(54) TEMPERATURE-OFFSETTING MAGNETICALLY COUPLED PRESSURE SENDER

(75) Inventor: Alan Alexander Burns, Portola Valley, CA (US)

(73) Assignee: MLHO, Inc., Portola Valley, CA (US)

(*) Notice: Subject to any disclaimer, the term of this patent is extended or adjusted under 35 U.S.C. 154(b) by 55 days.

(21) Appl. No.: 10/191,612

(22) Filed: Jul. 9, 2002

Related U.S. Application Data

(60) Provisional application No. 60/305,015, filed on Jul. 12, 2001.

(51) Int. Cl.[7] .............................................. G01L 19/04
(52) U.S. Cl. ........................................ 73/708; 73/700
(58) Field of Search .................................. 73/700–756

(56) References Cited

U.S. PATENT DOCUMENTS 4,111,042 A * 9/1978 Bryant ..................... 73/861.01
4,722,229 A * 2/1988 Hirota et al. ................. 73/725
4,890,497 A * 1/1990 Cahill .......................... 73/708

* cited by examiner

Primary Examiner—Edward Lefkowitz
Assistant Examiner—Jermaine Jenkins

(57) ABSTRACT

A temperature compensating or offsetting magnetically coupled pressure sender comprises a pressure responsive element coupled to a rotating permanent magnet via a temperature sensitive element. The sender is intended to relay a pressure reading from within sealed vessels, including vehicle tires, without requiring penetration the wall of the vessel. In vehicular applications, the recommended pressure is usually stated for "cold" tires. Operating a vehicle heats up its tires and increases their pressure, which may produce a misleading indication. Pressure senders described in this invention have temperature compensating or offsetting elements built in to the pressure senders so that the indicated pressure is always referenced to a "cold" tire. Spiral or helical metallic strips or elastomeric members may be employed as the temperature compensating or offsetting elements.

9 Claims, 2 Drawing Sheets

TEMPERATURE-OFFSETTING MAGNETICALLY COUPLED PRESSURE SENDER

CROSS-REFERENCES TO RELATED APPLICATIONS

This application is entitled to the benefit of Provisional Patent Application Serial No. 60/305,015, filed Jul. 12, 2001.

This application is related to non-Provisional Patent Applications Serial No. 09/922,395, filed Aug. 2, 2001, now U.S. Pat. No. 6,520,006, granted Feb. 18, 2003, and to non-Provisional patent application Ser. No. 09/927,736, filed Aug. 10, 2001, now U.S. Pat. No. 6,647,77, granted Nov. 18, 2003.

BACKGROUND

1. Field of Invention

This invention relates to remote pressure sensing, specifically using pressure transducers that rotate permanent magnets mechanically from within sealed vessels, including tires, to sensors responsive to the direction of a magnetic field.

2. Description of Prior Art

U.S. Pat. No. 6,620,006 to Burns discloses a remote pressure reporting system comprising (1) an in-tire magnetic pressure sending apparatus wherein a permanent magnet is rotated mechanically in response to pressure plus (2) a remote magnetic pressure reading apparatus mounted containing sensors responsive to magnetic field direction U.S. Pat. No. 6,647,771 also to Burns discloses another magnetically coupled tire pressure reporting system based on a novel magnetooptic display attached to the outer tire wall.

U.S. Pat. No. 3,807,232 to Wetterhorn describes a magnetically coupled pressure readout based on rotating a magnet in response to pressure using a Bourdon tube and sensing that rotation with a magnetic compass. Bourdon gauges are fragile, complex, and produce relatively week forces. Accordingly, Bourdon tube mechanisms are not well suited for supporting appreciable magnet masses and for overcoming friction. In fact, forces generated by the interaction of the earth's magnetic field with a supported magnet can exceed those available from Bourdon tube mechanisms. Bourdon mechanisms are too fragile for employment in vehicle tires. Additionally, the Wetterhorn transducer does not include a means for temperature compensation or offsetting.

Angular coupling between rotating elements on shafts via magnetic fields is generally well known. For example, U.S. Pat. No. 5,382,792 to Hurst et al, describes a coupling mechanism wherein permanent magnet pairs are incorporated into coaxial shafts to provide an instantaneous indication of the orientation of a rotating shaft internal to a motor vehicle engine. Such coupling mechanisms employ multiple permanent magnets, oriented pole-face to pole-face. In these types of devices, magnetic coupling between the pole faces of paired permanent magnets aligns the "output" shaft with the "input" shaft. To be effective, such mechanisms require narrow gaps between the pole faces of the respective magnet. These types of devices are hermetically encapsulated for protection from environmental debris and require penetration of the engine wall.

U.S. Pat. No. 3,777,565 to Munier et al. describes a sealed water or fluid meter with continuously rotating permanent magnets driven by impellers on input shafts magnetically coupled to magnets on outputs shafts for inducing synchronized rotation. The rotation per unit time of the output shaft indicates the flow rate. Angular displacements (errors) between the "input" and "output" shafts are tolerated and even increase torque coupling from the input magnet to the output magnet.

Numerous devices include mechanisms moving a permanent magnet in response pressure or other force to induce a sensed effect in a material responsive to variation in magnetic field strength. For example, U.S. Pat. No. 4,006,402 to Mincuzzi, U.S. Pat. No. 4,843,886 to Koppers, et al, and U.S. Pat. No. 4,627,292 to Dekrone, each describe a device based on either magnetoresistance and magnetic saturation. U.S. Pat. No. 4,339,955 to Iwasaki describes a mechanism that exploits variation in the incremental permeability of a magnetically soft material. Devices based on the sensing the strength of a magnetic field rather than field direction typically require a narrow spacing between the sensor and magnet and are very sensitive to changes in spacing, small misalignments, and extraneous magnetic fields. Accordingly, such devices generally require careful and extensive calibration before measurements are made.

U.S. Pat. No. 4,866,982 to Gault describes a tire pressure monitoring system where a stationary Hall-effect sensor measures spacing between a fixed magnet and a second magnet moveable in response to a linear pressure actuator. Changes in spacing between the magnets affect features of the combined magnetic field pattern. Variation in the combined pattern is determined from signal waveforms generated as the spaced magnets, rotating with a wheel, sweep by a stationary sensor. This device requires close coupling between magnet and sensor and penetration into the pressurized interior of the tire and rim. There are no temperature compensation or offsetting means.

U.S. Pat. No. 5,814,725 to Furuichi et al. describes a mechanism that penetrates a tire rim wherein a piston-driven screw rotates a permanent magnet. The strength of the magnetic field is detected by a stationary Hall-effect sensor that is mounted transversely to the magnet rotation axis. This type of device typically shares the same problems as the other devices that depend on sensing magnetic field strength rather than rotation. Again, there are no temperature compensation or offsetting means.

U.S. Pat. No. 5,047,629 to Geist describes a hermetically sealed mechanism for sensing linear displacements of a ferromagnetic armature (e.g., a single turn in a coil spring) according to the attractive force on freely rotating magnet. Disadvantages inherent in this type of device relate to the small distances required between the armature and the magnet, to the small amount of rotational displacement of the magnet produced, and to inadvertent magnetization of the armature.

Other examples of remote pressure reporting mechanisms involve changes in electromagnetic induction or inductive coupling between active elements. For example, U.S. Pat. No. 5,455,508 to Takahashi utilizes a form of time-varying (alternating current) electrical excitation. Disadvantages of these types of devices relate to the need to provide a source of operating power within the pressure container and to inadvertent production of eddy currents in nearby conductive materials that will distort the desired field. These types of devices do not sense magnetic field direction.

Still other concepts of remote pressure sensing involve a change the state indicator responding a preset pressure level. For example. U.S. Pat. No. 3,946,175 to Sitabkhan describes switching a magnetically susceptible need in response to pressure actuated displacement of a magnet. U.S. Pat. No.

5,542,293 to Tsuda et al. describes a conventional bellows actuated mechanism that uses a fixed and a moveable magnet to switch the orientation of a third magnet. U.S. Pat. No. 5,717,135 to Fioretta et al. describes use of magnetic coupling to switch the state of a transducer from producing to not producing a signal. These types of mechanisms are incapable of producing a continuous output responsive to pressure.

Other examples of remote monitoring of vehicle tire pressure involve wireless or telemetric transmission or data. For example, U.S. Pat. No. 5,960,804 to McClelland describes a radio transmitter that sends data collected and stored in a memory device within a tire to an external receiver. This active device requires a source of electrical energy (a battery) inside the tire. Alternatively, U.S. Pat. No. 6,053,038 to Schramm et al. proposes a scheme where an external oscillator circuit generates electromagnetic signals coupling to and energizing a second oscillator within the tire, which changes state responsive to tire pressure and/or other sensed parameters.

Several mechanisms besides Bourdon tubes have been proposed for converting pressure or force into rotary motion, For example, U.S. Pat. No. 4,307,928 to Petlock describes a helical bellows for imparting rotational displacement when compressed mechanically in order to make an improved electrical contact. A single, high pitch helical lead is employed because the desired rotational translation is small. U.S. Pat. No. 5,103,670 to Wu describes the use of a spiral screw to convert linear displacement from a conventional bellows to actuate a directly viewed rotary dial or pointer. U.S. Pat. No. 6,082,170 to Lia at al. describes a blood pressure apparatus that uses a diaphragm bellows and a compressible helical ribbon spring to rotate a dial pointer. None of these types of device employs magnetic coupling for remote sensing. Once again, there are no temperature compensation or offsetting means.

SUMMARY

In accordance with the present invention a temperature compensated or offsetting magnetically coupled pressure sender comprises a pressure responsive element coupled to a rotating permanent magnet by means of a temperature sensitive element. The sender is intended to relay a pressure reading from within sealed vessels, including vehicle tires, without requiring penetration the wall of the pressure vessel. In vehicular applications, the recommended pressure is usually stated for "cold" tires. Operating a vehicle heats up its tires and increases tire pressure, which may produce an erroneous indication. Pressure senders described in this invention have temperature-compensating or offsetting elements built in to the pressure senders so that the indicated pressure is always referenced to a "cold" tire.

Advantages

The primary advantage of the invented sender relates to the ease of providing compensation for temperature effects on the pressure within a sealed container as reported by a magnetically coupled pressure transducer.

Other advantages of the invented temperature-compensating sender are in its simplicity and robustness.

Still other advantages of the invented temperature-compensation sender are in its small size and weight.

A particular utility of the invented temperature-compensating sender is that vehicular safety is enhanced substantially by accurate tire pressure reporting that compensates for tire temperatures differing from the "cold" reference value.

Still further advantages will become apparent from a consideration of the ensuing description and accompanying drawings.

DRAWING FIGURES

REFERENCE NUMERALS IN DRAWINGS

| 10 | pressure sender | 10A | pressure sender |
|----|----|----|----|
| 10B | pressure sender | 12 | bellows |
| 12A | bellows | 12B | bellows |
| 14 | high pitch lead screw | 16 | back-driven follower |
| 18 | sender magnet | 18A | sender magnet |
| 18B | sender magnet | 20 | bearing |
| 20A | bearing | 20B | bearing |
| 22 | base | 22A | bas |
| 22B | base | 24 | thrust bearing |
| 26 | compression spring | 28 | magnet support plate |
| 28A | magnet support plate | 30 | torsion spring |
| 32 | cover | 32A | cover |
| 32B | cover | 34 | helical ribbon spring |
| 36 | magnet support bushing | 36A | magnet support bushing |
| 38 | helical bellows | | |

DESCRIPTION—PREFERRED EMBODIMENT

Figure 1:
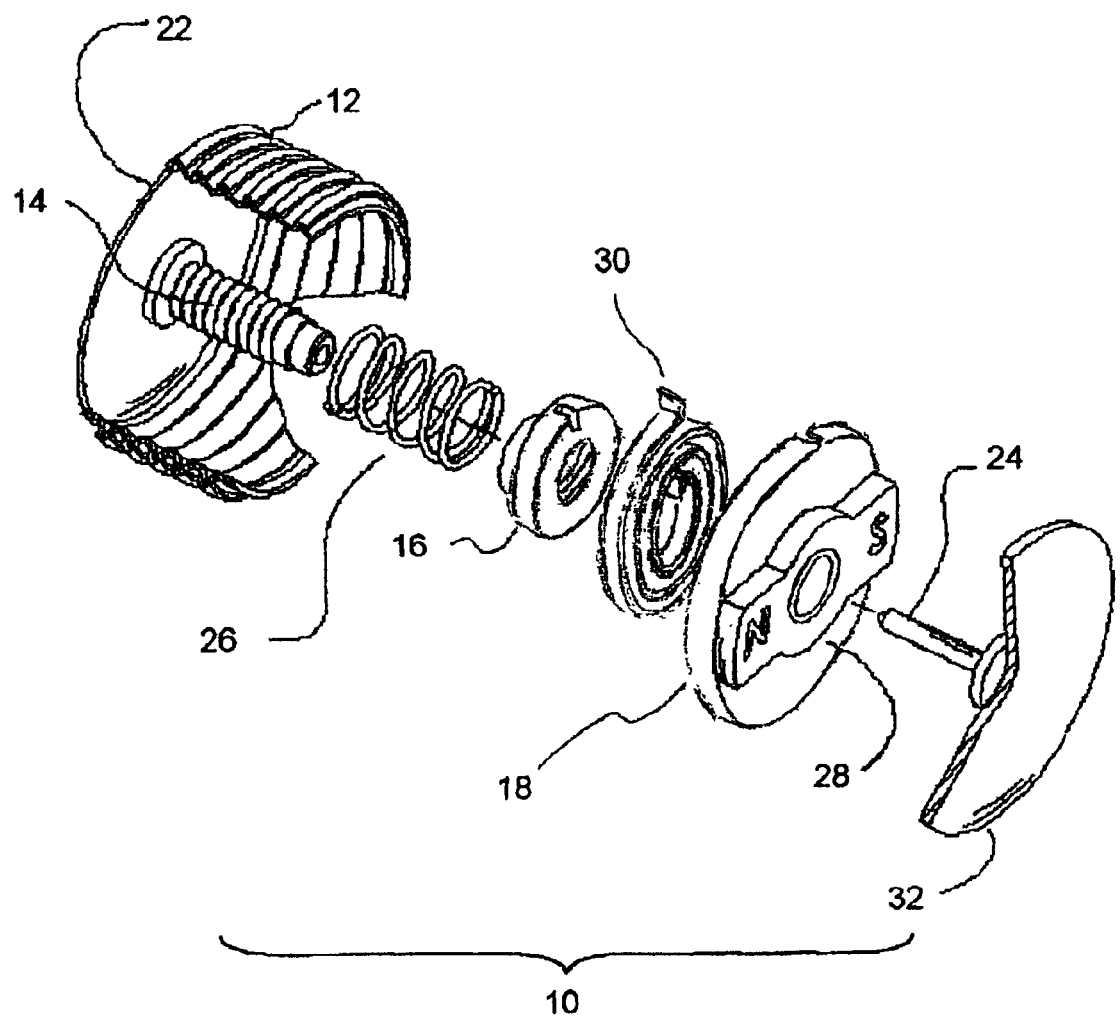
FIG. 1 is an exploded perspective view of a temperature offsetting magnetic pressure sender employing a lead screw and nut plus a torsion spring.

FIG. 1 depicts the preferred embodiment of this invention. Related arrangements are shown in U.S. Pat. Nos. 6,520,006 and 6,647,771 to Burns. The disclosures of these patents are incorporated herein by this reference. In particular, this invention relates to an improvement to U.S. Pat. No. 6,520,006 wherein the magnetically coupled pressure sender additionally (1) incorporates a temperature sensitive member in combination with cooperating elements converting translational movement responsive to pressure into rotational motion of a magnet or (2) incorporates a member combining the functions of responding rotationally to pressure translation and temperature change. In the descriptions set forth below, the temperature sensitive element is torsion spring 30 and the combined pressure and temperature responsive element is helical ribbon 34.

In FIG. 1, magnetically coupled pressure sender 10 comprises a bellows 12, a high-pitch lead screw 14, a follower 16, a sender magnet 18, a bearing 20, a base 22, and a cover 32 with an optional thrust bearing 24. Bellows 12 and base 22 form a hermetically sealed container. If said container comprising bellows 12 and base 22 is evacuated, pressure sender 10 is an absolute pressure sender. Load screw 14 is rigidly attached to the distal end of bellows 12. Follower 16 is free to travel along lead screw 14. Optional compression spring 26 holds follower 16 against base 22 and optional thrust bearing 24 while permitting follower 16 to rotate with respect to base 22. Other mechanical means may be used to accomplish these purposes of compression spring 26. Sender magnet 18 also rotates substantially freely on follower 16. An optional magnet support plate 28 may be provided. Sender magnet 18 and optional magnet support plate 28 are connected via a torsion spring 30 to follower 16. Torsion spring 30 is substantially spiral in form and may be wound from a bimetallic strip. The length, radius of curvature, or both, of torsion spring 30 changes in accordance to the temperature of torsion spring 30. In the preferred embodiment the angle of rotation between follower 16 and sender magnet 18 is substantially proportional to the absolute temperature of pressure sender 10. The clockwise or counterclockwise sense of said angle of rotation is controlled by both the clockwise or counterclockwise sense of the windings comprising torsion spring 30 and by the positive or negative sense of changes of the radius of curvature of torsion spring 30 in response to changes in temperature. The angle of rotation between follower 16 and sender magnet 18 is a function of the overall length and average radius of curvature of torsion spring 30. In the preferred embodiment, the sense of a change in the angle of rotation between follower 16 and sender magnet 18 in response to a temperature change is such to oppose rotation of sender magnet 18 produced by a change of pressure external to bellows 12 due to said temperature change. The direction of rotation of magnet 18 in response to a pressure increase is set by the right- or left-handedness of lead screw 14. Pressure sender 10 is preferably constructed of nonmagnetic or weakly magnetic materials.

Preferred Embodiment—Operation

Referring to FIG. 1, pressure sender 10 is supposed to be completely contained within a sealed container (not shown), which may be a vehicle tire or other pressure vessel. An increase of the pressure differential between the pressure external to bellows 12 and the pressure internal to bellows 12 causes bellows 12 to compress lengthwise. Lengthwise compression of bellows 12 in turn pushes lead screw 14 through follower 16, causing follower 16 to rotate in a desired direction. The clockwise or counterclockwise sense of rotation is set by the right- or left-handed sense of lead screw 14. A decrease in the pressure difference between the exterior and interior of bellows 12 produces longitudinal expansion of bellows 12 and therefore rotation of follower 16 in the opposite direction. Optional compression spring 26 resists longitudinal movement of follower 16 and forces follower 16 to rotate when bellows 12 expands. Compression spring 26 also serves to keep sender magnet 18 in a substantially constant planar position. Rotation of follower 16 is transferred through torsion spring 28 to sender magnet 18 and optional magnet support plate 28, causing sender magnet 26 to rotate accordingly. A change in the temperature of pressure sender 10 produces a corresponding change in the radius of curvature of torsion spring 30 and therefore produces a change in the relative rotation between follower 16 and sender magnet 18. Alternatively, an elastomeric member consisting of two or more layers of elastomeric materials or two or more layers of elastomeric and metallic materials may comprise torsion spring 30.

Figure 2:
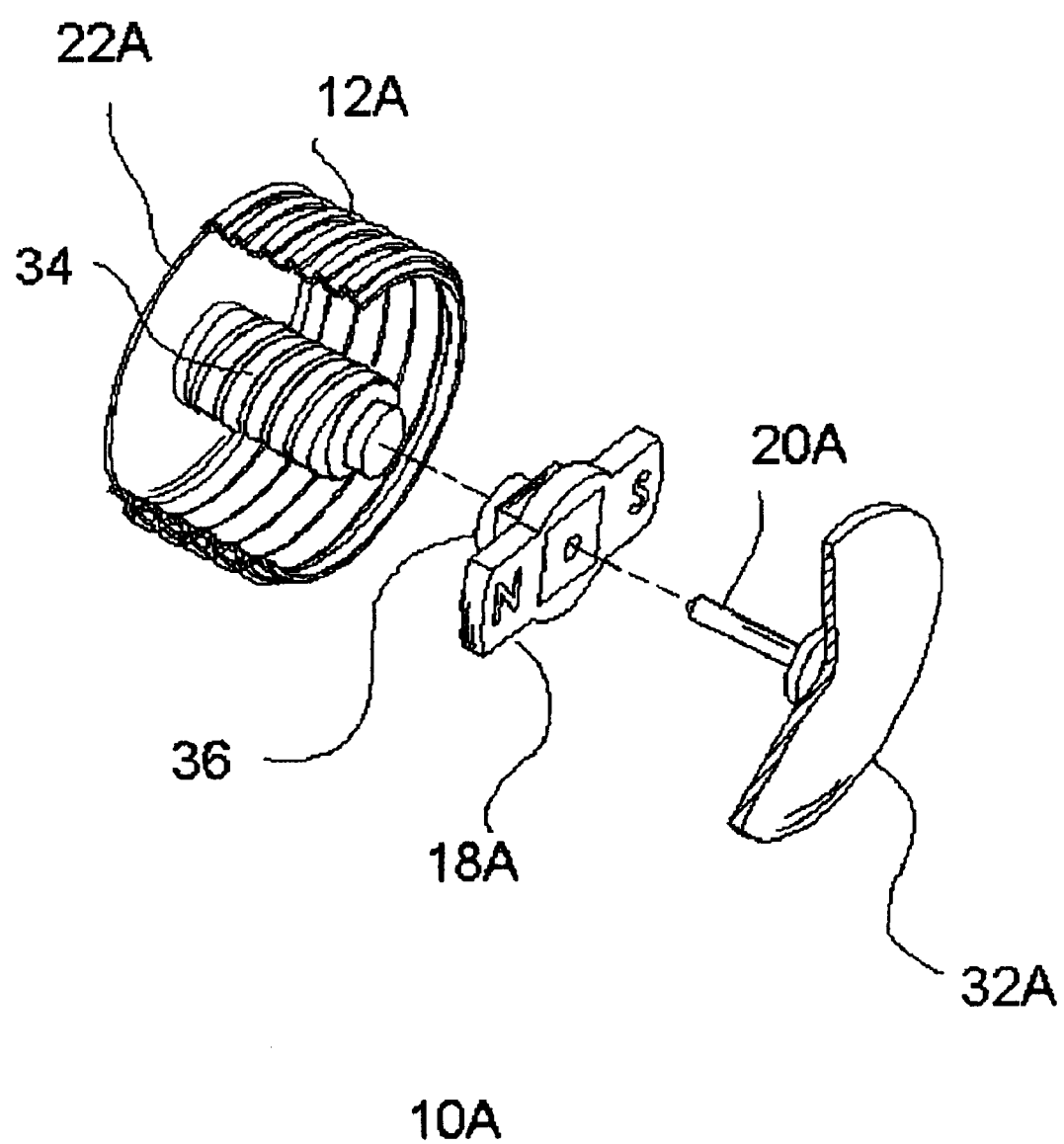
FIG. 2 is an exploded and perspective view showing a temperature offsetting magnetic pressure sender employing a helical ribbon spring.

Additional and Alternative Embodiment
Helical Ribbon Spring Actuator—Description FIG. 2 depicts an alternative embodiment of this invention. This embodiment comprises a pressure sender 10A based on a helical ribbon spring. In this embodiment, pressure sender 10A comprises a bellows 12A, a base 22A, a helical ribbon spring 34, a bearing 20A, a sender magnet 18A, and a magnet support bushing 36. Bellows 12A, base 22A and a cover 32A form a hermetically sealed container, which may be evacuated. If said sealed container comprising bellows 12A, cover 32A, and base 22A is evacuated, pressure sender 10A is an absolute pressure sender. Helical ribbon spring 34 may be comprised of a bimetallic strip wound into a helical shape. The distal end of helical ribbon spring 34 is rigidly attached to base 22A and the proximate end of helical ribbon spring 34 is rigidly attached to magnet support bushing 36 and magnet 18A. Magnet 18A and optional magnet support 28A freely rotate on bearing 20A. Compressing helical ribbon spring 34 causes magnet 18A and support plate 28A to rotate in a direction determined by the right- or left-handed sense of helical ribbon spring 34. Conversely, stretching helical ribbon spring 34 produces rotation of magnet 18A in the opposite direction. Helical ribbon spring 34 is preferably pre-compressed in order to accommodate any anticipated degree of stretching. Achieving a large degree of rotation versus length change of helical ribbon spring 34 generally favors use of a relatively slender helical ribbon with a low pitch angle (fewer turns per unit length). The overall degree of rotation depends on the running length and radius of helical ribbon spring 34.

Helical Ribbon Spring Actuator—Operation

As with the preferred embodiment, pressure sender 10A in this embodiment is supposed to be completely contained within a sealed container (not shown), which may be a vehicle tire or other pressure vessel. Referring to FIG. 2, an increase of the pressure differential between the pressure external to bellows 12A and base 22A and the pressure internal to bellows 12A and base 22A causes bellows 12A to compress lengthwise. Lengthwise compression of bellows 12A in turn compresses helical ribbon spring 34, causing a sender magnet 18A and optional magnet support 28A to route. A change in temperature of pressure sender 10A produces a change in the radius of curvature of helical ribbon spring 34 and also causes magnet 18A to rotate.

Conclusions, Ramifications, and Scope

Accordingly, it can be seen that I have provided a simple, inexpensive, and effective passive means for compensating for temperature effects on the pressure reported within a sealed container by magnetically coupled pressure transducers. In particular, temperature compensation or offsetting is essential for property reporting are pressure accurately.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

I claim:

1. In a method for externally sensing pressure of a fluid within a pressure vessel including the steps of
   (a) locating and mounting for rotation, a magnetic field source inside of the pressure vessel containing the fluid for providing a magnetic field having an axis of symmetry rotating in a particular plane;
   (b) coupling the magnetic field source to a pressure activated bellows also located inside of the pressure vessel expanding and contracting responsive to pressure differences ΔP between fluid pressure inside the pressure vessel and a known fluid pressure, the expansion and contraction of the bellows rotationally orienting the axis of symmetry of the provided magnetic field in the particular plane inside the pressure vessel;
   (c) sensing orientation of the axis of symmetry of the provided magnetic field outside the pressure vessel; and
   (d) correlating the orientation of the axis of symmetry of the magnetic field sensed to pressure within the pressure vessel, the improvement wherein:

said coupling the magnetic field source to a pressure activated bellows is by means of an intermediate member responsive to temperature within said pressure vessel.

2. The improvement as recited in claim 1 wherein said pressure vessel comprises a combination of an inflated, annular pneumatic tire hermetically sealed around a wheel rim for a vehicle.

3. The improvement as recited in claim 1 wherein said intermediate member responsive to temperature is a spiral ribbon expanding and contracting in response to temperature within the pressure vessel.

4. The improvement as recited in claim 1 wherein said intermediate member responsive to temperature is a helical ribbon expanding or contracting in response to temperature within the pressure vessel.

5. In a magnetically coupled pressure gauge for indicating fluid pressure within a pressure vessel outside the pressure vessel, comprising in combination, (a) a rotatable sender means mounted inside the pressure vessel for providing a rotatable magnetic field having a specific direction, the specific direction of the magnetic field in the plane parallel to an axis of symmetry of the magnetic field;

(b) a pressure actuated bellows mechanism also mounted inside of the pressure vessel coupled for rotating the sender means rotationally changing orientation of the specific direction of the magnetic field in a plane parallel to the axis of symmetry responsive to variations in fluid pressure within the vessel; and (c) sensor means mounted outside of the pressure vessel for sensing and indicating orientation of the specific direction of the magnetic field provided by the sender means in a plane parallel its axis of symmetry as rotated to a particular orientation by the pressure actuated bellows mechanism, the improvement wherein:

said pressure activated bellows mechanism is coupled for rotating said sender means rotationally includes an intermediate member responsive to temperature within said pressure vessel.

6. The improvement as recited in claim 5 wherein said mechanism for coupling the bellows to the rotating sender means comprises, in combination, a high-pitch lead screw, a back-driven follower, and a temperature responsive member.

7. The improvement as recited in claim 5 wherein said intermediate member responsive to temperature is a spiral ribbon expanding and contracting in response to temperature within the pressure vessel.

8. The improvement as recited in claim 5 wherein said intermediate member responsive to temperature is a helical ribbon expanding and contracting in response to temperature within the pressure vessel.

9. The improvement as recited in claim 5 wherein said pressure vessel comprises a combination of an inflated, annular pneumatic tire hermetically sealed around a wheel rim for a vehicle.

* * * * *